(12) United States Patent
Hood

(10) Patent No.: US 7,904,488 B2
(45) Date of Patent: Mar. 8, 2011

(54) TIME STAMP METHODS FOR UNIFIED PLANT MODEL

(75) Inventor: Gavan W. Hood, Upper Lockyer (AU)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 463 days.

(21) Appl. No.: 10/896,575

(22) Filed: Jul. 21, 2004

(65) Prior Publication Data

US 2006/0020578 A1 Jan. 26, 2006

(51) Int. Cl.
*G06F 17/30* (2006.01)
*G06F 7/00* (2006.01)

(52) U.S. Cl. .......................... 707/803; 707/705

(58) Field of Classification Search ................ 707/1, 3, 707/102, 104.1, 705, 803, 999.1, 999.3
See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,990,838 A | 2/1991 | Kawato et al. | |
| 5,065,429 A * | 11/1991 | Lang ............................. | 705/56 |
| 5,072,374 A | 12/1991 | Sexton et al. | |
| 5,117,351 A * | 5/1992 | Miller ........................... | 707/10 |
| 5,185,708 A | 2/1993 | Hall et al. | |
| 5,191,611 A * | 3/1993 | Lang ............................. | 705/53 |
| 5,253,184 A | 10/1993 | Kleinschnitz | |
| 5,301,320 A | 4/1994 | McAtee et al. | |
| 5,446,868 A | 8/1995 | Gardea et al. | |
| 5,455,775 A | 10/1995 | Huber et al. | |
| 5,485,620 A | 1/1996 | Sadre et al. | |
| 5,504,891 A | 4/1996 | Motoyama et al. | |
| 5,537,585 A | 7/1996 | Blickenstaff et al. | |
| 5,557,790 A * | 9/1996 | Bingham et al. ............... | 707/101 |
| 5,572,731 A | 11/1996 | Morel et al. | |
| 5,581,765 A * | 12/1996 | Munroe et al. ................ | 718/107 |
| 5,608,903 A * | 3/1997 | Prasad et al. .................... | 707/10 |
| 5,611,059 A | 3/1997 | Benton et al. | |
| 5,619,724 A | 4/1997 | Moore | |
| 5,634,048 A | 5/1997 | Ryu et al. | |
| 5,644,740 A | 7/1997 | Kiuchi | |
| 5,675,748 A | 10/1997 | Ross | |
| 5,715,413 A | 2/1998 | Ishai et al. | |
| 5,721,905 A | 2/1998 | Elixmann et al. | |
| 5,761,499 A | 6/1998 | Sonderegger | |
| 5,797,137 A | 8/1998 | Golshani et al. | |
| 5,812,773 A | 9/1998 | Norin | |
| 5,813,020 A * | 9/1998 | Hohensee et al. ............ | 715/234 |

(Continued)

OTHER PUBLICATIONS

Brown, Aaron, et al., "ISTORE: Introspective Storage for Data-Intensive Network Services", Proceedings of the Seventh Workshop on Hot Topics in Operating Systems, Mar. 29-30, 1999, pp. 32-37.*

(Continued)

*Primary Examiner* — Robert Stevens
(74) *Attorney, Agent, or Firm* — Turocy & Watson LLP; R. Scott Speroff; John M. Miller

(57) ABSTRACT

A system that facilitates generation of a unique identifier comprises a random number generator. A unique identifier creator receives a number generated by the random number generator and object instance data associated with an object. The unique identifier creator utilizes the object instance data and the random number to generate a unique identifier for an object associated with the object instance data.

32 Claims, 14 Drawing Sheets

U.S. PATENT DOCUMENTS

| | | | |
|---|---|---|---|
| 5,828,851 A | 10/1998 | Nixon et al. | |
| 5,832,486 A | 11/1998 | Itoh et al. | |
| 5,832,487 A * | 11/1998 | Olds et al. | 707/10 |
| 5,838,563 A | 11/1998 | Dove et al. | |
| 5,848,273 A | 12/1998 | Fontana et al. | |
| 5,862,052 A | 1/1999 | Nixon et al. | |
| 5,884,025 A | 3/1999 | Baehr et al. | |
| 5,884,033 A | 3/1999 | Duvall et al. | |
| 5,913,029 A | 6/1999 | Shostak | |
| 5,913,217 A * | 6/1999 | Alger et al. | 707/101 |
| 5,924,094 A | 7/1999 | Sutter | |
| 5,936,539 A | 8/1999 | Fuchs | |
| 5,940,294 A | 8/1999 | Dove | |
| 5,940,854 A | 8/1999 | Green, Jr. et al. | |
| 5,946,681 A * | 8/1999 | Shorter | 1/1 |
| 5,951,440 A | 9/1999 | Reichlinger | |
| 5,960,420 A | 9/1999 | Leymann et al. | |
| 5,966,705 A | 10/1999 | Koneru | |
| 5,978,577 A | 11/1999 | Rierden et al. | |
| 5,980,078 A | 11/1999 | Krivoshein et al. | |
| 5,983,016 A | 11/1999 | Brodsky et al. | |
| 6,005,943 A * | 12/1999 | Cohen et al. | 380/30 |
| 6,011,899 A | 1/2000 | Ohishi et al. | |
| 6,032,208 A | 2/2000 | Nixon et al. | |
| 6,044,217 A | 3/2000 | Brealey et al. | |
| 6,063,129 A | 5/2000 | Dadd et al. | |
| 6,081,899 A | 6/2000 | Byrd | |
| 6,098,116 A | 8/2000 | Nixon et al. | |
| 6,101,531 A | 8/2000 | Eggleston et al. | |
| 6,135,646 A * | 10/2000 | Kahn et al. | 709/217 |
| 6,182,064 B1 * | 1/2001 | Shorter et al. | 707/3 |
| 6,195,591 B1 | 2/2001 | Nixon et al. | |
| 6,208,987 B1 | 3/2001 | Nihei | |
| 6,234,899 B1 | 5/2001 | Nulph | |
| 6,256,740 B1 * | 7/2001 | Muller et al. | 726/12 |
| 6,266,726 B1 | 7/2001 | Nixon et al. | |
| 6,275,977 B1 | 8/2001 | Nagai et al. | |
| 6,308,168 B1 | 10/2001 | Dovich et al. | |
| 6,308,224 B1 | 10/2001 | Leymann et al. | |
| 6,311,187 B1 | 10/2001 | Jeyaraman | |
| 6,327,511 B1 | 12/2001 | Naismith et al. | |
| 6,336,152 B1 | 1/2002 | Richman et al. | |
| 6,356,920 B1 | 3/2002 | Vandersluis | |
| 6,377,957 B1 | 4/2002 | Jeyaraman | |
| 6,393,566 B1 | 5/2002 | Levine | |
| 6,398,106 B1 | 6/2002 | Ulvr et al. | |
| 6,409,082 B1 | 6/2002 | Davis et al. | |
| 6,411,987 B1 | 6/2002 | Steger et al. | |
| 6,415,983 B1 | 7/2002 | Ulvr et al. | |
| 6,425,051 B1 | 7/2002 | Burton et al. | |
| 6,438,744 B2 | 8/2002 | Toutonghi et al. | |
| 6,445,963 B1 | 9/2002 | Blevins et al. | |
| 6,446,202 B1 | 9/2002 | Krivoshein et al. | |
| 6,457,053 B1 | 9/2002 | Satagopan et al. | |
| 6,469,986 B1 | 10/2002 | Lecheler et al. | |
| 6,473,656 B1 | 10/2002 | Langels et al. | |
| 6,484,061 B2 | 11/2002 | Papadopoulos et al. | |
| 6,501,996 B1 | 12/2002 | Bieber | |
| 6,505,247 B1 | 1/2003 | Steger et al. | |
| 6,510,352 B1 | 1/2003 | Badavas et al. | |
| 6,539,271 B2 | 3/2003 | Lech et al. | |
| 6,539,430 B1 | 3/2003 | Humes | |
| 6,539,458 B2 | 3/2003 | Holmberg | |
| 6,631,519 B1 | 10/2003 | Nicholson et al. | |
| 6,643,555 B1 | 11/2003 | Eller et al. | |
| 6,661,426 B1 | 12/2003 | Jetha et al. | |
| 6,664,981 B2 | 12/2003 | Ashe et al. | |
| 6,681,227 B1 | 1/2004 | Kojima et al. | |
| 6,687,707 B1 * | 2/2004 | Shorter | 707/103 R |
| 6,687,817 B1 | 2/2004 | Paul | |
| 6,697,797 B1 | 2/2004 | Hoggatt et al. | |
| 6,704,746 B2 | 3/2004 | Sokolov et al. | |
| 6,714,949 B1 | 3/2004 | Frey, Jr. | |
| 6,714,981 B1 | 3/2004 | Skaggs | |
| 6,738,821 B1 | 5/2004 | Wilson et al. | |
| 6,745,089 B2 | 6/2004 | Rasmussen et al. | |
| 6,748,486 B2 | 6/2004 | Burton et al. | |
| 6,751,634 B1 | 6/2004 | Judd | |
| 6,751,667 B1 * | 6/2004 | Helliwell | 709/226 |
| 6,758,403 B1 | 7/2004 | Keys et al. | |
| 6,760,721 B1 | 7/2004 | Chasen et al. | |
| 6,760,732 B2 | 7/2004 | Busshart et al. | |
| 6,763,395 B1 | 7/2004 | Austin | |
| 6,766,312 B2 | 7/2004 | Landt | |
| 6,769,095 B1 | 7/2004 | Brassard et al. | |
| 6,778,537 B1 | 8/2004 | Ishibashi | |
| 6,801,822 B1 | 10/2004 | Fujiwara et al. | |
| 6,807,632 B1 | 10/2004 | Carpentier et al. | |
| 6,809,732 B2 | 10/2004 | Zatz et al. | |
| 6,836,892 B2 | 12/2004 | Ikoma et al. | |
| 6,839,790 B2 | 1/2005 | Barros De Almeida et al. | |
| 6,842,769 B1 | 1/2005 | Kim et al. | |
| 6,853,920 B2 | 2/2005 | Hsiung et al. | |
| 6,865,509 B1 | 3/2005 | Hsiung et al. | |
| 6,868,413 B1 | 3/2005 | Grindrod et al. | |
| 6,874,145 B1 | 3/2005 | Ye et al. | |
| 6,874,146 B1 | 3/2005 | Iyengar | |
| 6,880,060 B2 | 4/2005 | Talagala et al. | |
| 6,889,282 B2 | 5/2005 | Schollenberger | |
| 6,901,578 B1 | 5/2005 | Beaven et al. | |
| 6,904,473 B1 | 6/2005 | Bloxham et al. | |
| 6,920,474 B2 | 7/2005 | Walsh et al. | |
| 6,928,521 B1 | 8/2005 | Burton et al. | |
| 6,930,985 B1 | 8/2005 | Rathi et al. | |
| 6,934,749 B1 | 8/2005 | Black et al. | |
| 6,938,079 B1 | 8/2005 | Anderson et al. | |
| 6,944,626 B2 | 9/2005 | Cameron et al. | |
| 6,947,947 B2 | 9/2005 | Block et al. | |
| 6,950,900 B1 | 9/2005 | McKean et al. | |
| 6,954,770 B1 | 10/2005 | Carlson et al. | |
| 6,961,728 B2 | 11/2005 | Wynblatt et al. | |
| 6,973,556 B2 | 12/2005 | Milligan et al. | |
| 6,975,913 B2 | 12/2005 | Kreidler et al. | |
| 7,016,976 B2 * | 3/2006 | Merrells et al. | 709/245 |
| 7,124,305 B2 * | 10/2006 | Margolus et al. | 713/193 |
| 7,127,613 B2 * | 10/2006 | Pabla et al. | 713/171 |
| 7,127,724 B2 * | 10/2006 | Lewallen | 719/332 |
| 7,178,033 B1 * | 2/2007 | Garcia | 713/184 |
| 7,249,181 B2 * | 7/2007 | Helliwell | 709/226 |
| 7,265,854 B1 * | 9/2007 | Hohensee et al. | 358/1.15 |
| 7,287,030 B2 * | 10/2007 | Margolus et al. | 707/10 |
| 2002/0012401 A1 | 1/2002 | Karolys et al. | |
| 2002/0013748 A1 | 1/2002 | Edmison et al. | |
| 2002/0038296 A1 * | 3/2002 | Margolus et al. | 707/1 |
| 2002/0069167 A1 | 6/2002 | Conlow | |
| 2002/0073236 A1 | 6/2002 | Helgeson et al. | |
| 2002/0087786 A1 | 7/2002 | Burton et al. | |
| 2002/0091838 A1 | 7/2002 | Rupp et al. | |
| 2002/0103785 A1 | 8/2002 | Harvey | |
| 2002/0131764 A1 * | 9/2002 | David et al. | 386/69 |
| 2002/0194577 A1 | 12/2002 | Connor et al. | |
| 2003/0014387 A1 | 1/2003 | Kreidler et al. | |
| 2003/0065673 A1 | 4/2003 | Grobler et al. | |
| 2003/0088708 A1 * | 5/2003 | Lewallen | 709/315 |
| 2003/0090514 A1 | 5/2003 | Cole et al. | |
| 2003/0120710 A1 | 6/2003 | Pulsipher et al. | |
| 2003/0123467 A1 | 7/2003 | Du et al. | |
| 2003/0126308 A1 | 7/2003 | Kim | |
| 2003/0177114 A1 | 9/2003 | Lin et al. | |
| 2003/0212828 A1 | 11/2003 | Miyazaki et al. | |
| 2003/0218641 A1 | 11/2003 | Longobardi | |
| 2004/0006401 A1 | 1/2004 | Yamada et al. | |
| 2004/0024995 A1 | 2/2004 | Swaine | |
| 2004/0044421 A1 | 3/2004 | Brune et al. | |
| 2004/0073565 A1 | 4/2004 | Kaufman et al. | |
| 2004/0098153 A1 | 5/2004 | Neudeck | |
| 2004/0139098 A1 * | 7/2004 | Margolus et al. | 707/100 |
| 2004/0139303 A1 * | 7/2004 | Margolus et al. | 712/220 |
| 2004/0143578 A1 * | 7/2004 | Margolus et al. | 707/10 |
| 2004/0143743 A1 * | 7/2004 | Margolus et al. | 713/176 |
| 2004/0143744 A1 * | 7/2004 | Margolus et al. | 713/176 |
| 2004/0143745 A1 * | 7/2004 | Margolus et al. | 713/176 |
| 2004/0148326 A1 * | 7/2004 | Nadgir et al. | 709/200 |
| 2004/0156075 A1 * | 8/2004 | Hohensee et al. | 358/1.15 |
| 2004/0162808 A1 * | 8/2004 | Margolus et al. | 707/1 |
| 2004/0167790 A1 | 8/2004 | Grasse | |
| 2004/0187015 A1 * | 9/2004 | Geer et al. | 713/200 |

| | | |
|---|---|---|
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0255140 A1* | 12/2004 | Margolus et al. ............. 713/193 |
| 2004/0260591 A1 | 12/2004 | King |
| 2005/0005289 A1 | 1/2005 | Adolph et al. |
| 2005/0021757 A1* | 1/2005 | Helliwell ..................... 709/226 |
| 2005/0044112 A1 | 2/2005 | Yamamoto et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0097111 A1* | 5/2005 | Mukherjee et al. ........... 707/100 |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0108402 A1* | 5/2005 | Colson et al. ................. 709/227 |
| 2005/0120021 A1 | 6/2005 | Tang et al. |
| 2005/0125625 A1* | 6/2005 | Kilian et al. .................. 711/202 |
| 2005/0129247 A1 | 6/2005 | Gammel et al. |
| 2005/0135782 A1 | 6/2005 | Ando et al. |
| 2005/0144172 A1* | 6/2005 | Kilian et al. .................... 707/10 |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |

OTHER PUBLICATIONS

Pitzek, Stefan, et al., "Configuration and Management of a Real-Time Smart Transducer Network", ETFA '03, vol. 1, Sep. 16-19, 2003, pp. 407-414.*

Kubiatowicz, John, et al., "OceanStore: An Architecture for Global-Scale Persistent Storage", ASPLOS 2000, Cambridge, MA, Nov. 12-15, 1999, pp. 190-201.*

Microsoft Computer Dictionary, 5th Edition, Microsoft Press, Redmond, WA, © 2002, p. 438.*

Microsoft Computer Dictionary, 5th Edition, Microsoft Press, Redmond, WA, © 2002, pp. 553-555.*

Karp, Alan, et al., "The Client Utility as a Peer-to-Peer System", Networking 2002 Workshops, LNCS 2376, Springer, Berlin, Germany, © 2002, pp. 260-273.*

Homburg, Philip, et al., "An Architecture for a Wide Area Distributed System", Proc. Of the 7th Workshop on ACM SIGOPS European Workshop: Systems Support for Worldwide Applications, Connemara, Ireland, Sep. 9-11, 1996, pp. 75-82.*

Van Steen, Maarten, et al., "A Model for Worldwide Tracking of Distributed Objects", Proc. of the 1996 Conf. on Telecommunications Information Networking Architecture, © 1996, pp. 1-13.*

Microsoft Computer Dictionary, 5th Edition, Microsoft Press, Redmond, WA, © 2002, p. 438.*

Hnetynka, Petr, et al., "Distributed Versioning Model for MOF", WISICT, vol. 58, Cancun, Mexico, Jan. 5-8, 2004, pp. 1-6.*

John Kubiatowicz, et al.; OceanStore: An Architecture for Global-Scale Persistent Storage; ASPLOS 2000, Cambridge, Massachusetts; 2000.

Roy Goldman, et al.; From Semistructured Data to XML: Migrating the Lore Data Model and Query Language; 1999.

Pitzek et al., Configuration and Management of a Real-Time Smart Transducer Network, 2003 IEEE, 2003, 4 pages.

European Search Report dated Jun. 12, 2005 for European Patent Application Serial No. EP05016793, 3 pages.

Internet Archive Wayback Machine. Internet Search Results Page (Online) Jul. 3, 2007. XP 002440660. http://web.archive.org/web/*/http://www.ietf.org/internet-drafts/draft-stucker-sip-guid-00-txt>. Last accessed Jul. 3, 2007, 1 page.

Ambler. Enterprise Ready Object IDs, Internet article (Online), Jun. 29, 2001. pp. 1-2. XP 002440718. http://www.ddj.com/dept/architect/184415770. Last accessed Jul. 3, 2007.

European Search Report for European Patent Application No. EP 05015698 dated Sep. 8, 2007, 7 pgs.

OA Dated Dec. 12, 2008 for CN Application Serial No. 200510087521.6, 7 pages.

CN OA dated Feb. 15, 2008 for Chinese Application No. 200510087521.6, 25 pages.

CN OA dated Aug. 8, 2008 for Chinese Application No. 200510087521.6, 8 pages.

EP OA dated Jan. 30, 2008 for European Application No. 05015698.3-1243, 1 page.

* cited by examiner

| OBJECT 1 | UNIQUE IDENTIFIER 1 |
|---|---|
| OBJECT 2 | UNIQUE IDENTIFIER 2 |
| OBJECT 3 | UNIQUE IDENTIFIER 3 |
| OBJECT 4 | UNIQUE IDENTIFIER 4 |
| OBJECT 5 | UNIQUE IDENTIFIER 5 |
| OBJECT 6 | UNIQUE IDENTIFIER 6 |
| , | , |
| OBJECT N | UNIQUE IDENTIFIER N |

FIG. 8

TIME STAMP METHODS FOR UNIFIED PLANT MODEL

TECHNICAL FIELD

The present invention relates generally to unique identifiers, and more particularly to creating a unique identifier format that provides benefits in connection with manufacturing applications as well as indexing and searching.

BACKGROUND OF THE INVENTION

Advancements in computer technology and software have enabled communication to occur almost instantaneously. For example, through email an individual in New York can receive a document, image, message, or the like from an individual in California in a matter of seconds. Such advances in technology are not limited solely to communications, but directly or indirectly affect every business and individual. For instance, industrial control systems have enabled modern factories to become partially or completely automated in many circumstances, thereby reducing cost of the factory and consequently passing on such cost reduction to a consumer.

Development of software components and interfacing therebetween is an exemplary advancement in technology that has facilitated cross-software communication. To ensure that components and/or objects interface correctly, Globally Unique Identifiers (GUIDs) are employed to uniquely identify such interfaces. A GUID is a pseudo-random number used in software applications, wherein each GUID is desirably unique. The GUID is an implementation of a standard entitled Universally Unique Identifier (UUID) as specified by the Open Software Foundation. The UUID standard calls for 128 bits to be employed to uniquely identify a component, object, document, etc. Previously, GUIDs were generated based at least in part upon a network card MAC address (e.g., the address was utilized as part of the GUID), meaning that a document could be tracked to the computer which created such document. Due to privacy concerns, however, today's GUIDs do not include a portion of such network card MAC addresses, and are simply employed as a pseudo-random number for uniqueness.

In a manufacturing setting, disparate systems and/or methodologies are employed to uniquely identify an object, document, etc. For example, an object whose generation is based upon a machine can have a time-stamp associated with such generation, thus identifying the object based upon the time-stamp. Further, a sequential number can be employed to identify an object, document, or the like in a manufacturing environment. For instance, an internal counter can be employed in connection with the machine, and objects, documents, etc. can be assigned an identifier according to sequence of creation. In a distributed computing environment/enterprise system, however, these identification methodologies can prove to be inadequate as overlap may occur. Particularly, two connected devices can generate a component, object, document, or the like at a substantially similar time, rendering time-stamps inadequate as unique identifiers. Further, a reboot or system crash can result in re-numbering and duplication of an assigned sequential number. Accordingly, time-stamps and/or sequential numbering, while important for indexing and searching in a manufacturing environment, are insufficient as unique identifiers in a distributed computing environment/enterprise system.

Data bases are another area in which utilization of unique identifiers may be necessary. Particularly, when there exists a plurality of data bases with disparate formats in an enterprise system, it can be extremely difficult to effectively combine that data and perform data mining tasks across the entirety of the data. A data base contains a plurality of rows and a plurality of fields, wherein each row should be unique so that when two data bases are rolled up (combined), there is no overwriting of data. A GUID can be placed in each row to provide this required uniqueness—however, semantics for identification of the row as the primary key will be lost. For example, names are typically employed as a unique identifier in a stand-alone data base. When several data bases are combined, however, similar files with identical names can cause overwriting of rows, and thus loss of data. Therefore, a GUID can be placed in each to ensure uniqueness between rows, but searching by a GUID is time-consuming and can be frustrating, as it is essentially a pseudo-random number that will mean nothing an individual performing the search.

Accordingly, there exists a need in the art for a system and/or methodology for providing uniqueness to objects, documents, and the like in an enterprise system and/or in a data mining/indexing application.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention makes up for the many of the aforementioned deficiencies of conventional unique identifiers that are employed to identify objects. The subject invention provides a system and/or methodology for generating a unique identifier that can be employed in connection with indexing and/or searching a plurality of objects that are utilized in a manufacturing environment. As manufacturing systems trend towards substantially complete automation, a greater number of objects associated with such automation will be generated. Further, as industries become more global, comparison and indexing of objects relating to manufacturing performance of disparate factories at disparate locations will become more desirable. Such a plethora of objects/data requires an indexing scheme that enables users to quickly and efficiently locate a desired object.

The present invention accomplishes these and other benefits by employing data that is often utilized in a manufacturing environment to uniquely identify objects. More particularly, objects in a manufacturing environment typically are associated with time-stamps and/or sequence numbers, which are defined herein as object instance data. For a specific example, work orders are typically associated with a time-stamp. Indexing an object by a time-stamp alone, however, can result in disastrous overwrite of data, as it is possible that two objects will have substantially similar time-stamps. The subject invention mitigates occurrences of data overwrite by packaging at least object instance data together with a random/pseudorandom number to create a unique identifier.

Therefore, for example, in an instance that two objects are time-stamped at a substantially similar time, due to existence of the random/pseudorandom number probabilities of identical identifiers are miniscule.

In accordance with one aspect of the present invention, the unique identifiers are created in accordance with Universal Unique Identifier (UUID) standards. Such a format is beneficial when previously generated objects are identified in a central directory by conventional unique identifiers, such as globally unique identifiers (GUIDs). Utilizing this format provides indexing compatibility between objects identified by conventional identifiers and objects identified by the unique identifiers of the present invention. Thus, a separate indexing scheme is not required, thereby enabling efficient location of objects.

The unique identifiers of the present invention can also comprise/utilize various other identifying indicia in connection with identifying a particular object. For example, an object name, object type, version number, machine identity, node identity, location, and any other suitable identifying indicia can be employed in connection with the present invention to facilitate indexing/identifying an object. More particularly, these identifying indicia can be hashed and placed within the unique identifier according to a pre-determined format (e.g., a format in compliance with UUID standards). Thereafter the unique identifier can be interrogated, and identifying indicia (and the object instance data) can be extracted, analyzed, and/or manipulated according to application requirements.

In accordance with yet another aspect of the present invention, a common set of algorithms can be employed to generate unique identifiers regardless of type of object instance data and/or identifying indicia is utilized to generate such unique identifier. Accordingly, a common indexing scheme can be provided regardless of type of object instance data an/or identifying indicia is employed in connection with generating the unique identifier. This provides a substantial benefit over conventional systems/methods employed to index objects in a manufacturing environment, as several indexing schemes are typically required. Specifically, conventional indexing schemes required objects identified by time-stamps to be indexed separately from objects identified by sequence number.

The present invention further provides for efficient data rollup of a plurality of databases. For one particular example, a car manufacturing company may utilize several plants that exist at disparate geographic locations and store data/objects relating to manufacturing in disparate databases. It is often desirable to direct this data/objects from disparate locations to a single database for comparison and/or recordkeeping. Utilizing conventional object identification systems and/or methods, a chance of data overwrite existed as two machines at two disparate places can generate objects with substantially similar time-stamps and/or sequence numbers. The unique identifiers of the present invention mitigate such occurrences of data overwrite by providing random data within the unique identifier. It is possible to utilize purely random identifiers, such as GUIDs, to identify objects. However, other useful data must be linked as metadata to the objects, causing redundant uniqueness and confusion. Further, employing GUIDs eliminates a possibility of utilizing time-stamps, sequence numbers, or other useful identifying indicia as a primary indexing key. Thus, the present invention provides various benefits in connection with rollup of data over a distributed system.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 8 is an exemplary database that can be employed in connection with the present invention.

DETAILED DESCRIPTION OF THE INVENTION

Figure 1:
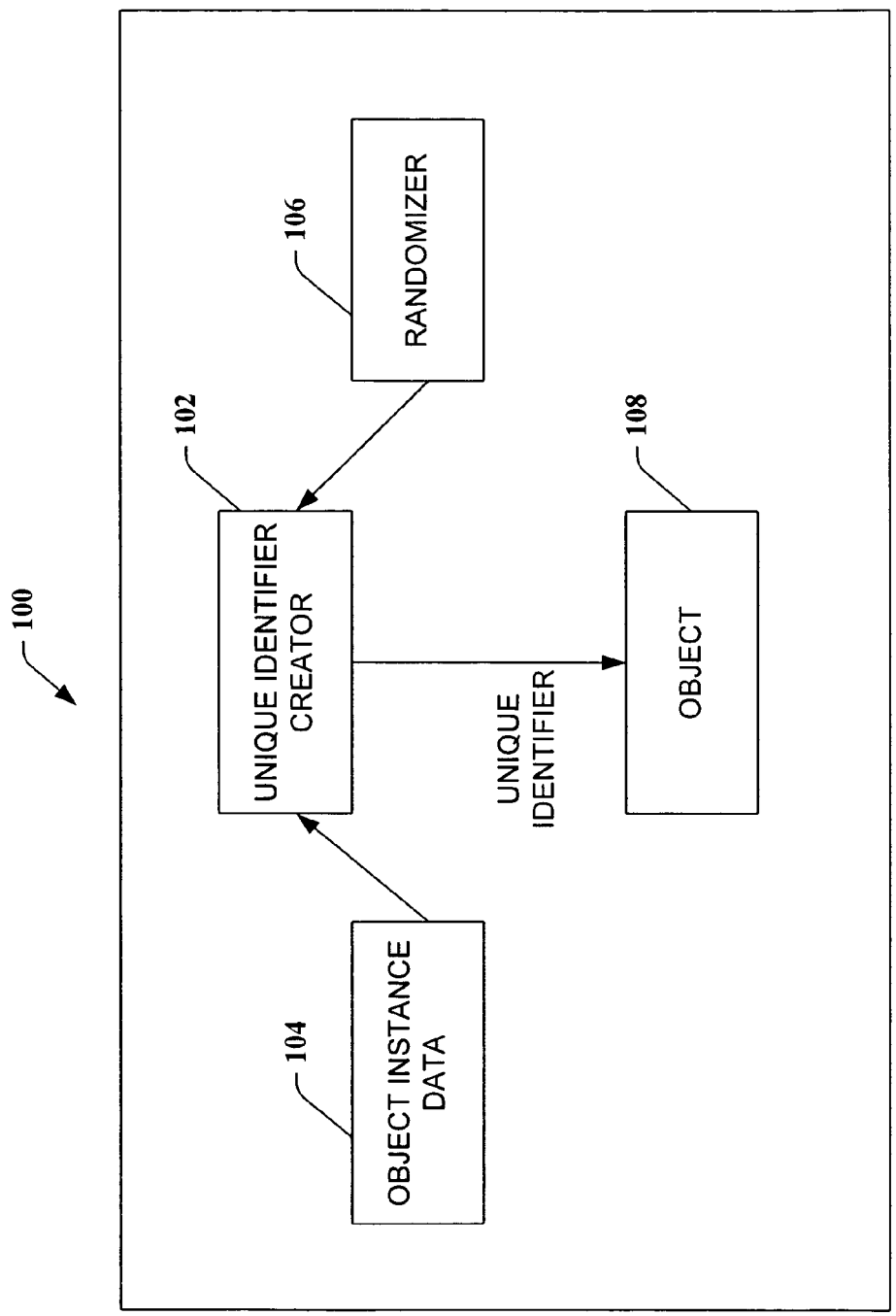
FIG. 1 is a high-level block diagram of a system that facilitates generation of a unique identifier in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one particular aspect of the subject invention. The present invention relates to a novel system 100 that facilitates generation of a unique identifier and association of such identifier with a desired object. Particularly, the system 100 includes a unique identifier creator 102 that receives object instance data 104. As utilized in this description, object instance data 104 is defined as time-stamp information and/or sequential information. It is understood, however, that various other information that is useful in a manufacturing/factory setting can be employed in connection with the present invention. For example, type of object (e.g., document, spreadsheet, . . . ), machine type and/or identity of the creator of the object, structure of the object, etc. can be employed in connection with generating a unique identifier. It is to be understood that the unique identifier creator 102 can be embedded within manufacturing device(s), such as process controllers and other suitable manufacturing devices. Further, a conventional computer system can include the unique identifier creator 102.

The system 100 further includes a randomizer 106, wherein the unique identifier creator 102 receives random/pseudorandom data therefrom. The randomizer 106 is employed to mitigate occurrences of overlapping identifiers. For instance, two objects created at a substantially similar time may be associated with substantially similar timestamps. If those timestamps alone are utilized as identifiers, there will be an overlap and one object may be overwritten. Similarly, a reboot or crash can cause a machine that provides sequential identifiers to overwrite previous sequential identifiers. The randomizer 106 mitigates such occurrences by providing the unique identifier creator 102 with random data. The unique identifier creator 102 combines the object instance data 104 with the random data provided by the randomizer 106 to generate a unique identifier and associate it with an object 108. In accordance with one aspect of the present invention, the generated unique identifier can be 128 bits in size, which is a size of conventional GUIDs. Thus, unique identifiers created in accordance with the present invention are compatible with conventional data structures and/or indexing.

Further, an algorithm employed in connection with the randomizer 106 can embed useable data within pseudorandom data provided by such randomizer 106. Particularly, an algorithm employed to ensure uniqueness within the randomizer 106 can be configured to allow inspection of pseudo random data produced therefrom, thereby enabling inspection/extraction of valuable information about the object identified.

For instance, the pseudo random data can indicate class identification of a computer object, type identification of a computer object, etc. (e.g., the unique identifier is an object identifier and pseudo-random data therein includes indicia relating to its parent in an inheritance hierarchy). Moreover, the pseudo-random data output by the randomizer 106 can include indicia and/or explicit information relating to origin of a unique identifier. This information can be an index into system table(s) that indicates production specific information such as location in a plant/enterprise in which the unique identifier was generated. Thereby time and/or or location indicia relating to the object can be obtained.

The present invention provides various benefits over conventional GUIDs and other identifiers. For example, GUIDs are 128 bits in length, but contain no data that can be employed in connection with indexing objects and/or searching over a plurality of objects. Utilizing a unique identifier generated by the unique identifier creator 102 enables one to index and search based upon information that is useful in a manufacturing setting, such as the object instance data 104 (e.g., time-related data and/or series data). In a particular example, work orders are often associated with timestamps, and are indexed according to such timestamps. In an enterprise environment, indexing such work orders according only to the timestamps is inefficient and can result in data loss. Moreover, an entirely separate indexation is required for objects that are identified sequentially. Thus, for instance, objects identified by timestamps must be indexed separately from objects identified by sequence. In accordance with one aspect of the present invention, the unique identifier creator 102 can employ a set of algorithms that provides a single format for indexation and identification regardless of whether the objects are identified by timestamps or sequence number. Accordingly, the unique identifiers created via employment of the present invention can be interrogated by utilizing a single set of algorithms, rather than requiring disparate algorithms to interrogate/index differing formats (e.g., timestamp and sequence number formats).

The system 100 also provides a mechanism in which to generate unique identifiers that incorporate the object instance data 104 with respect to archived objects. More particularly, the unique identifier creator 102 is not limited to creating unique identifiers at time of creation of the object 108. Rather, the unique identifier creator 102 can be employed to update objects utilized in manufacturing that were previously identified by timestamps and/or sequence number (e.g., the object instance data 104). The unique identifier creator 102 can thereafter access such object instance data 104 and receive random data from the randomizer 106 to create a unique identifier that can be employed to identify the pre-existing object 108. Such an aspect is beneficial during instances that archived data in a data store that was previously not networked is brought into an enterprise system, as it mitigates occurrences of duplicate identifiers and overwriting of data. Further, the unique identifier creator 102 can generate a unique identifier at time of creation of the object instance data 104. Such an aspect enables updating of unique identifiers upon alteration of objects.

In accordance with another aspect of the present invention, the unique identifier creator 102 can receive a plurality of information together with the object instance data 104 to generate a unique identifier. For instance, an assigned name can be placed within the unique identifier, as well as object type, version number, and all other suitable identification information relating to the object 108. The system 100 can also be employed to decipher the unique identifier and break such unique identifier into disparate identifiable portions. For one particular example, the unique identifier can be stored in a database, and the unique identifier creator 102 can be employed to extract the object instance data 104 from the unique identifier and store such object instance data in a field within the database. Similarly, the unique identifier creator 102 can extract the random data generated by the randomizer 106 and place that within a separate field within the database, and other identifying data within the unique identifier can be placed within disparate fields. Thus, data employed by the unique identifier creator 102 to generate the unique identifier exists in separate fields and not within a single unique identifier. Thereafter those fields can be interrogated while maintaining uniqueness of the row of the database encompassing such fields.

In accordance with yet another aspect of the present invention, the unique identifier creator 102 can generate a unique identifier based upon a timestamp independent of a time zone. For example, the unique identifier creator 102 can utilize Universal Coordinated Time to provide a consistent format for the unique identifier across an enterprise system that is distributed throughout a plurality of time zones. Universal Coordinated Time (UTC) is employed around the world, as time zones are expressed as positive or negative differentiations therefrom. Furthermore, the FILETIME time format can be employed by the unique identifier creator 102 to generate and/or modify a timestamp to render such timestamp independent of time zone. Particularly, time-stamp entries employed by the unique identifier creator 102 can employ a substantially similar base time as FILETIME. The FILETIME structure is a 64-bit value representing a number of 100 nanosecond intervals since Jan. 1, 1601 (UTC). In accordance with another aspect of the present invention, Greenwich Mean Time can be employed in connection with generating the unique identifier. Thus, it is to be understood that any suitable time format/conversion can be employed by the unique identifier creator 102 in connection with generating a unique identifier that is independent of time zone of object creation/residency. Alternatively, it may be desirable to utilize local times in connection with a timestamp. Conversions from local time to UTC and vice versa are made by the unique identifier creator 102 to generate a unique identifier according to a desirable format (e.g., time representations can be selected by a user of the present invention). Conversions can include accounting for a local time offset, and can utilize a time according to a server (e.g., SQL date-time) in connection with generating the unique identifier.

Figure 2:
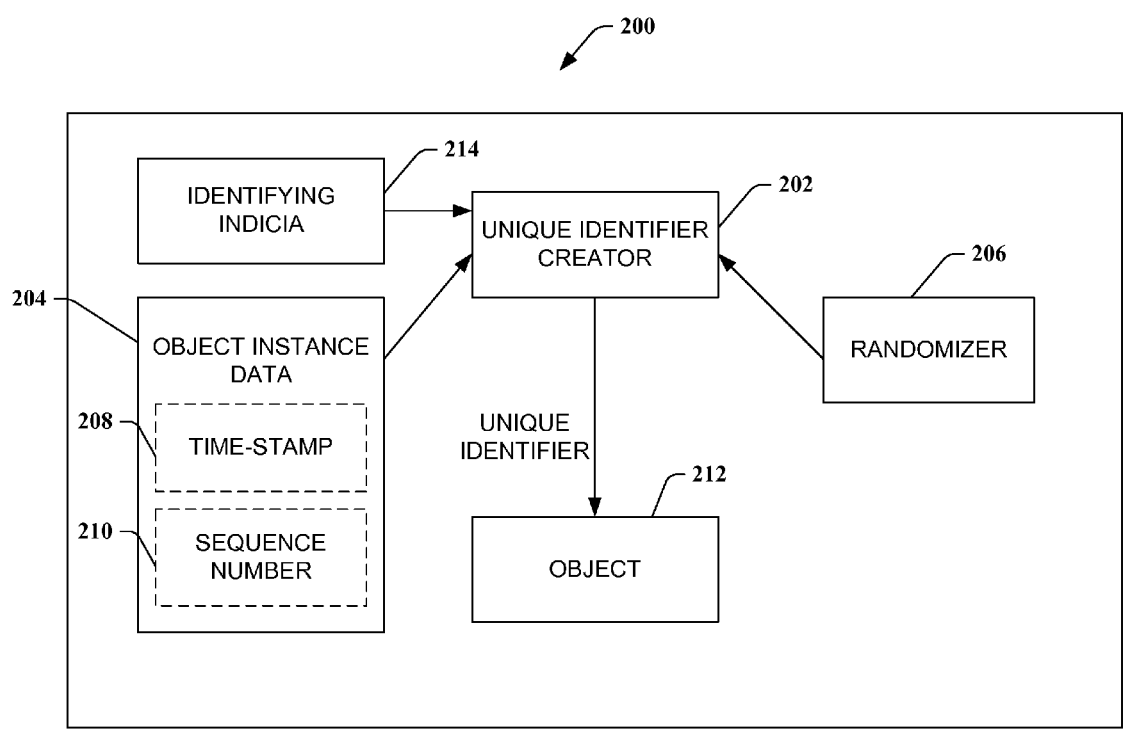
FIG. 2 is a block diagram of a system that facilitates generation of a unique identifier in accordance with an aspect of the present invention.

Turning now to FIG. 2, a system 200 that facilitates generation of a unique identifier that includes relevant information that can be used to identify and/or index objects is illustrated. The system 200 includes a unique identifier creator 202 that receives object instance data 204 and random data from a randomizer 206. As described above, the object instance data 204 can include a time-stamp 208 or time-stamp related data as well as a sequence number 210 or sequence related data. These data types are often employed in a manufacturing environment to facilitate identification of a generated object. For example, work orders, shipping orders, inventory counts, and other suitable information that can be encompassed within an object are often associated with time-stamps or sequential data in a factory setting. Conventional unique identifiers are employed solely for uniqueness, and are opaque in nature (e.g., they are impenetrable and include no identifying indicia). Generating a unique identifier that includes the object instance data 204 enables data rollup and consistent indexing within a unified plant model. While the object instance data 204 is illustrated to include the time-stamp 208 and the sequence number 210, it is to be understood that the unique identifier creator 202 can generate a unique identifier by employing the time-stamp 208 and/or the sequence number 210. Particularly, an object 212 may be associated with only the time-stamp 208. Similarly, the object 212 may be associated with the sequence number 210 and not the time-stamp 208. Thus, the system 200 requires only one of a time-stamp 208 and the sequence number 210 to generate a unique identifier, although both may be employed to create such unique identifier if both are available to the unique identifier creator 202.

The unique identifier creator 202 can also employ various other identifying indicia 214 in connection with generating a unique identifier and associating such unique identifier with the object 212. For instance, object type, version type, version number, object name, location of creation of the object 212, and various other suitable identifying indicia can be employed in connection with the present invention. The unique identifier creator 202 can embed at least portions of the identifying indicia 214 into the unique identifier, and the object 212 can be indexed and/or searched over based at least in part upon the generated unique identifier and contents thereof. For example, the object 212 can be primarily indexed based upon the time-stamp 208, and secondarily indexed based at least in part upon the identifying indicia 214. The randomizer 206 is provided to mitigate occurrences of duplicate time-stamps 208 and/or sequence numbers 210 between two or more objects. By employing a random number in connection with the object instance data 204 and identifying indicia 214, possibilities of generating a duplicate unique identifier for two are more objects are extremely small. This is extremely important given globalization of businesses and current trends towards bringing archived data into a network and trends of rolling up data of different databases.

Figure 3:
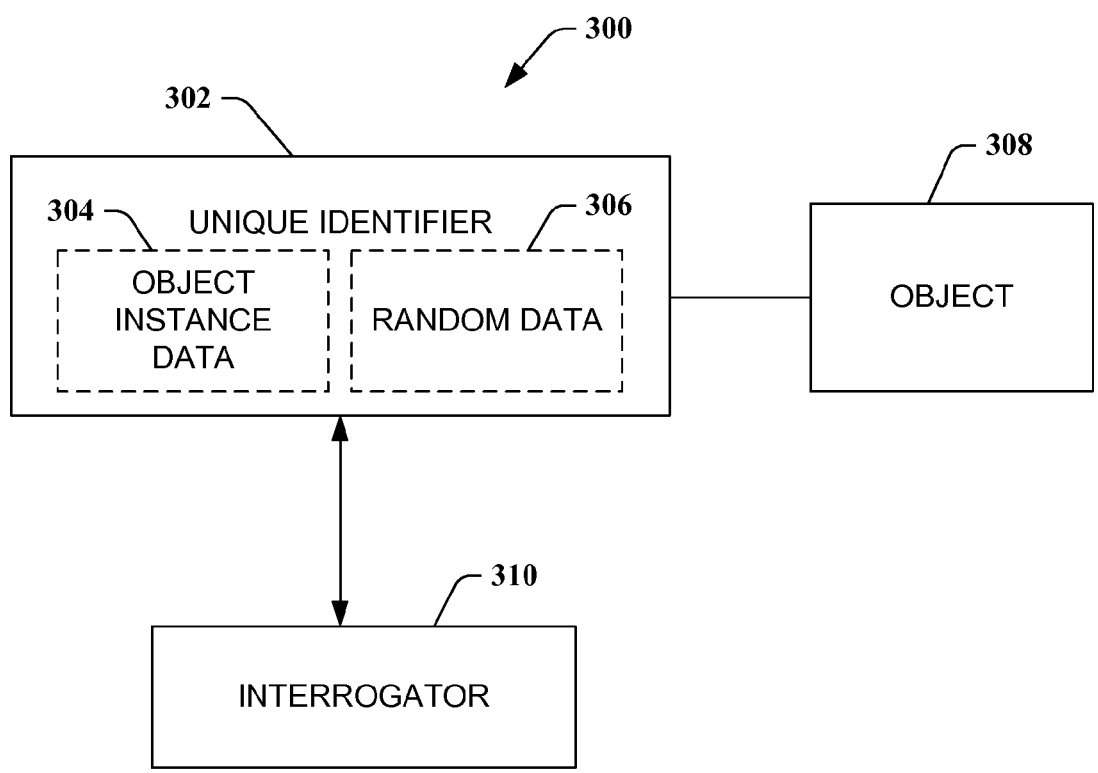
FIG. 3 is a block diagram of a system that facilitates generation of a unique identifier in accordance with an aspect of the present invention.

Now referring to FIG. 3, a system 300 for interrogating a unique identifier created in accordance with the present invention is illustrated. The system 300 includes a unique identifier 302 that includes identifying indicia that is commonly utilized in a manufacturing setting. The unique identifier is associated with an object 308, wherein such unique identifier 302 is employed to identify the object 308. While the unique identifier 302 is illustrated as being associated with the object, it is to be understood that the unique identifier 302 can be embedded within the object 308. For instance, the unique identifier 302 can be embedded within the object 308. In accordance with another aspect of the present invention, the object 308 and the unique identifier 302 can be linked together. The unique identifier 302 includes object instance data 304, previously defined as time-stamp data and/or sequence number data relating to the object 308 created and/or employed in a manufacturing/factory environment. For instance, the object 308 can be a work order with a time-stamp associated therewith. The object 308 can further be a word processing document, spreadsheet, a web page, or any other suitable object that is employable within a manufacturing/factory setting. The unique identifier 302 also includes random data 306 that is generated by a randomizer. In accordance with one aspect of the present invention, the random data 306 can be pseudo-random data. The random data 306 is employed to mitigate occurrences of duplicity between identifiers associated with two or more objects.

An interrogator 310 is employed to extract data relevant to an operation and/or search from the unique identifier 302. For example, the interrogator 310 can be utilized to extract and analyze the object instance data 304 within the unique identifier 302. In accordance with one aspect of the present invention, the interrogator 310 employs a common set of algorithms regardless of what type of object instance data 304 resides within the unique identifier 302. For example, two disparate indexing schemes are not required for objects 308 associated with time-stamp data and objects 308 associated with sequence number data. Further, the interrogator can extract and/or analyze other identifying indicia within the unique identifier 302. For instance, the unique identifier can include version number object type, etc., and the interrogator 310 can extract and/or analyze each of such identifying indicia. Thus, a single indexing scheme can be generated when employing the system 300, rather than creating confusing and possibly redundant multiple indexing schemes.

Figure 4:
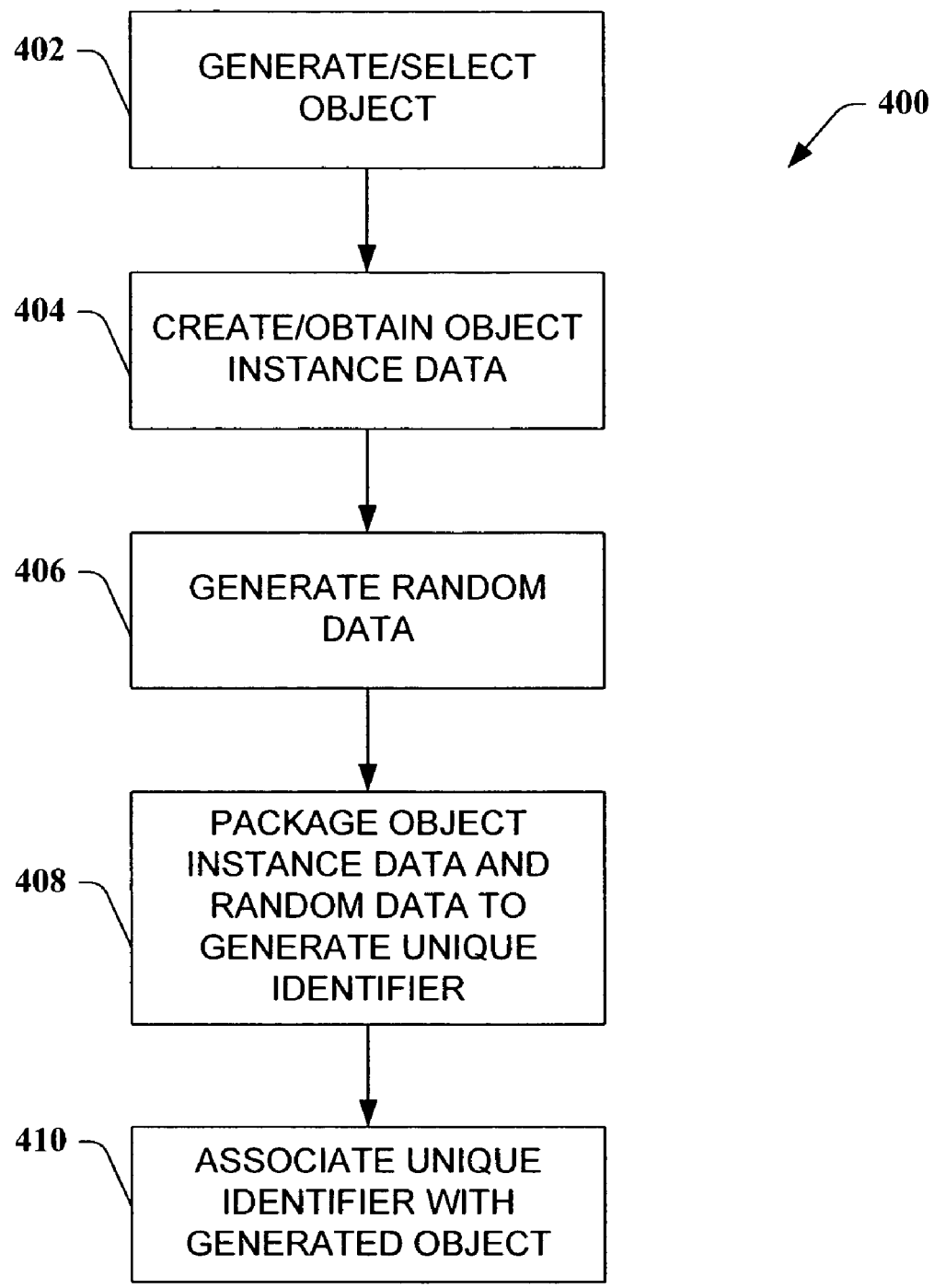
FIG. 4 is a representative flow diagram illustrating a methodology for uniquely identifying an object in accordance with an aspect of the present invention.

Referring now to FIG. 4, a methodology 400 for generating a unique identifier with object instance data embedded therein is illustrated. While, for purposes of simplicity of explanation, the methodology 400 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 402, and object is generated/selected. For instance, the methodology 400 can be employed with newly generated objects as well as archived objects previously created. These objects include any suitable object that is employable within a manufacturing environment. For example, a work order document is an object in accordance with the present invention, as are spreadsheets indicating operation parameters of a plurality of automated machines at a particular point in time. As factories become increasingly automated, objects will more frequently be automatically generated given a particular industrial task.

At 404, object instance data associated with the object is created in a case of a newly generated object and/or obtained in a case of a pre-existing object. Object instance data is defined as a time-stamp and/or a sequence number associated with the object. These types of data are typically utilized in industrial environments to at least partially identify objects created for an application within such environment. This object instance data alone, however, is insufficient to identify objects, particularly in an enterprise environment (e.g., within a unified plant model). This is because objects can be created at substantially similar times, and sequence numbers can overlap due to errors/reboots.

At 406, random data is generated to mitigate occurrences of overlap between identifying indicia of objects. Conventional GUIDs also employ randomness to uniquely identify objects—however, GUIDs are employed solely for such randomness and include no useful information that can be extracted therefrom. At 408, the object instance data is packaged with the random data to generate a unique identifier in accordance with the present invention. A single set of algorithms can be employed regardless of type or combination of object instance data that is employed to identify an object. For instance, a format of the generated unique identifier can be manipulated and controlled to enable a single indexation of objects despite disparate identifiers employed to identify such objects.

At 410, the unique identifier is associated with the generated/selected object to effectively provide unique identification of such object. For instance, the unique identifier can be linked to the object within a database. In accordance with a disparate embodiment, the unique identifier is embedded within an object, and each object can be indexed according to their respective unique identifiers. It is understood that conventional GUIDs can be employed to uniquely identify objects rather than the unique identifiers of the subject invention. There are, however, several deficiencies associated with indexing and identifying objects according to GUIDs. For example, GUIDs require utilization of additional memory space, as useful indicating indicia (e.g., time-related data, sequence-related data, . . . ) must be stored and maintained separately. Further, the GUIDs must be utilized as a primary indexing/searching key if they are employed as a unique identifier. As the GUIDs are solely employed for uniqueness, however, it can be nearly impossible to distinguish between objects. The methodology 400 makes up for such deficiencies by providing object instance data within the unique identifier.

Figure 5:
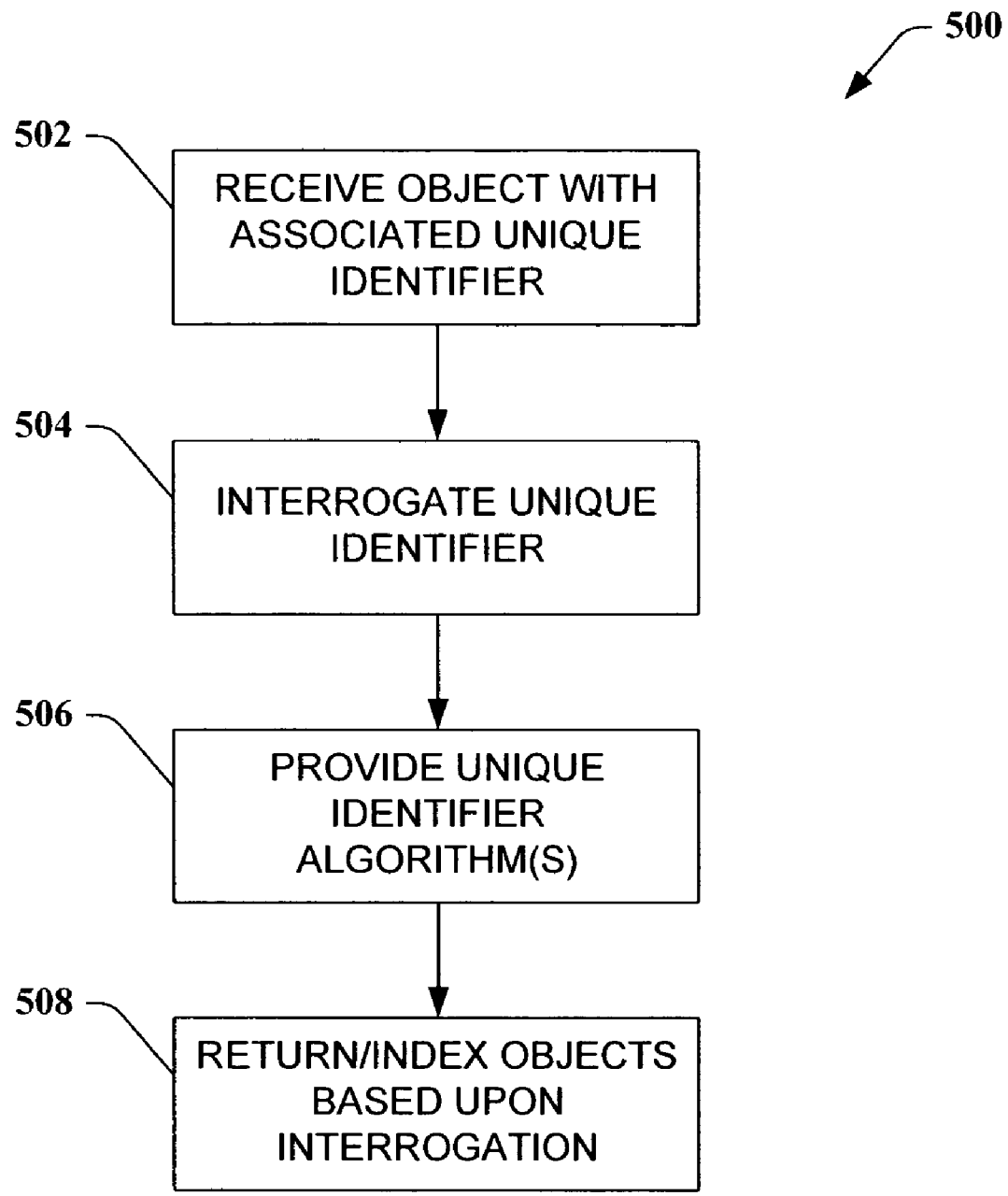
FIG. 5 is a representative flow diagram illustrating a methodology for interrogating a unique identifier generated in accordance with an aspect of the present invention.

Now referring to FIG. 5, a method for extracting information related to an object from a unique identifier is illustrated. At 502, an object with an associated unique identifier is received. For example, the unique identifier can be associated with an object in a database. In a different embodiment, the unique identifier is embedded within the object, and the object is indexed according to such unique identifier. It is to be understood that any linking/association between an object and corresponding unique identifier is contemplated by the present invention and intended to fall under the scope of the hereto-appended claims.

At 504, the unique identifier is interrogated—therefore, at least the object instance data relating to the object is interrogated. For example, a user can request that all objects generated on a particular date be returned to such user for further analysis. Further, requests can be made relating to various other identifying indicia resident within the unique identifier. For instance, the user can request that all objects created on a particular day that are of a particular type be returned to the user. At 506, unique identifier algorithms are provided to effectuate such searching and/or data extraction. In accordance with one aspect of the present invention, substantially similar sets of algorithms are employed to create and interrogate the unique object identifier. This enables generation of a single indexing scheme, even when objects are associated with disparate object instance data.

At 508, objects are returned/indexed based upon the interrogation. For example, during an instance that a user interrogates a plurality of unique identifiers for objects created on a particular date, a listing of such objects can be indexed and/or returned to the user. Further, links or other location specifying devices can be provided to enable the user to select and/or activate a particular object within the listing of objects. Thus, the interrogation can be performed over a single database/index structure rather than requiring the user first to locate an appropriate data base and thereafter interrogate an object.

Figure 6:
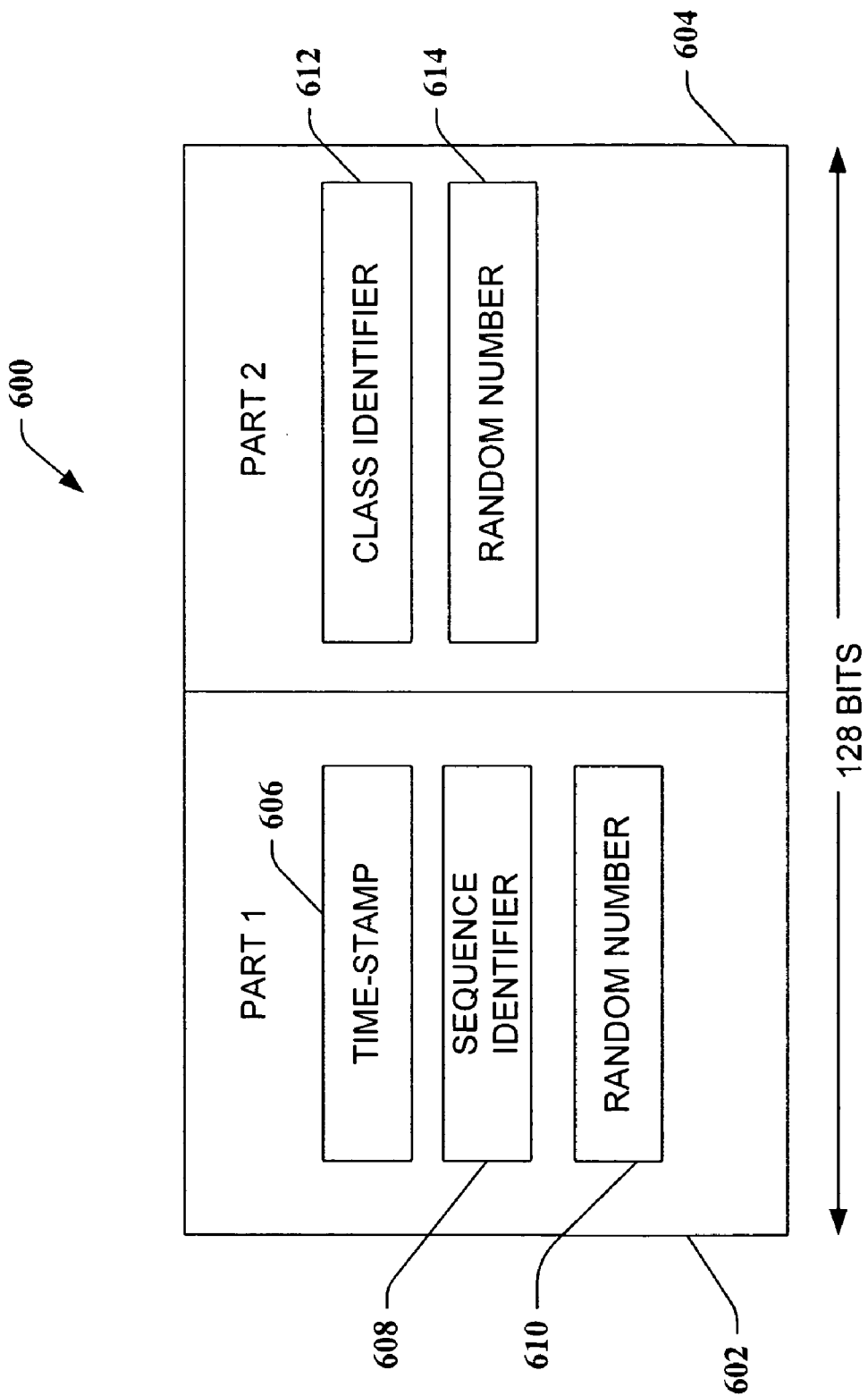
FIG. 6 is an exemplary format of a unique identifier generated in accordance with an aspect of the present invention.

Now referring to FIG. 6, an exemplary unique identifier 600 in accordance with the present invention is illustrated. The unique identifier 600 includes two portions 602 and 604, which can be manipulated based upon application requirements. The structure of the unique identifier 600 is based upon a universal unique identifier format (UUID), which is also employed as the format for GUIDs. The format, however, can be tailored to application and/or business requirements. For example, in the unique identifier 600 as illustrated in FIG. 6, part 1 602 includes a time-stamp 606 or time-related information, a sequence identifier 608 or sequence-related information, and a random number 610. Part 2 604 includes a class identifier 612 and a random number 614. Thus, the unique identifier 600 can be interrogated, and time/series data can be extracted therefrom. Further, an object class of an object identified by the unique identifier 600 can be determined from interrogating such unique identifier. The unique identifier 600 utilizes 128 bits, which is identical to a number of bits employed by identifiers utilizing the UUID format.

It is to be understood that the unique identifier 600 can include a greater amount of information than illustrated. For example, the unique identifier can include a MAC ID, a path of a machine that created the object, a version identifier, node identifier, machine identifier, or any other suitable information that can be employed to facilitate identification of an object or portion thereof. Further, hashes of such information are contemplated by the present invention and intended to fall under the scope of the hereto-appended claims. A common set of algorithms is employed to generate all unique identifiers, thereby enabling a single indexing scheme to be created. In accordance with one aspect of the present invention, the time-stamp 606 can employ a substantially similar base time as FILETIME. Other base times, however, can be employed in accordance with the present invention, and conversion between base times as is known in the art can be employed in connection with the unique identifier 600.

Figure 7:
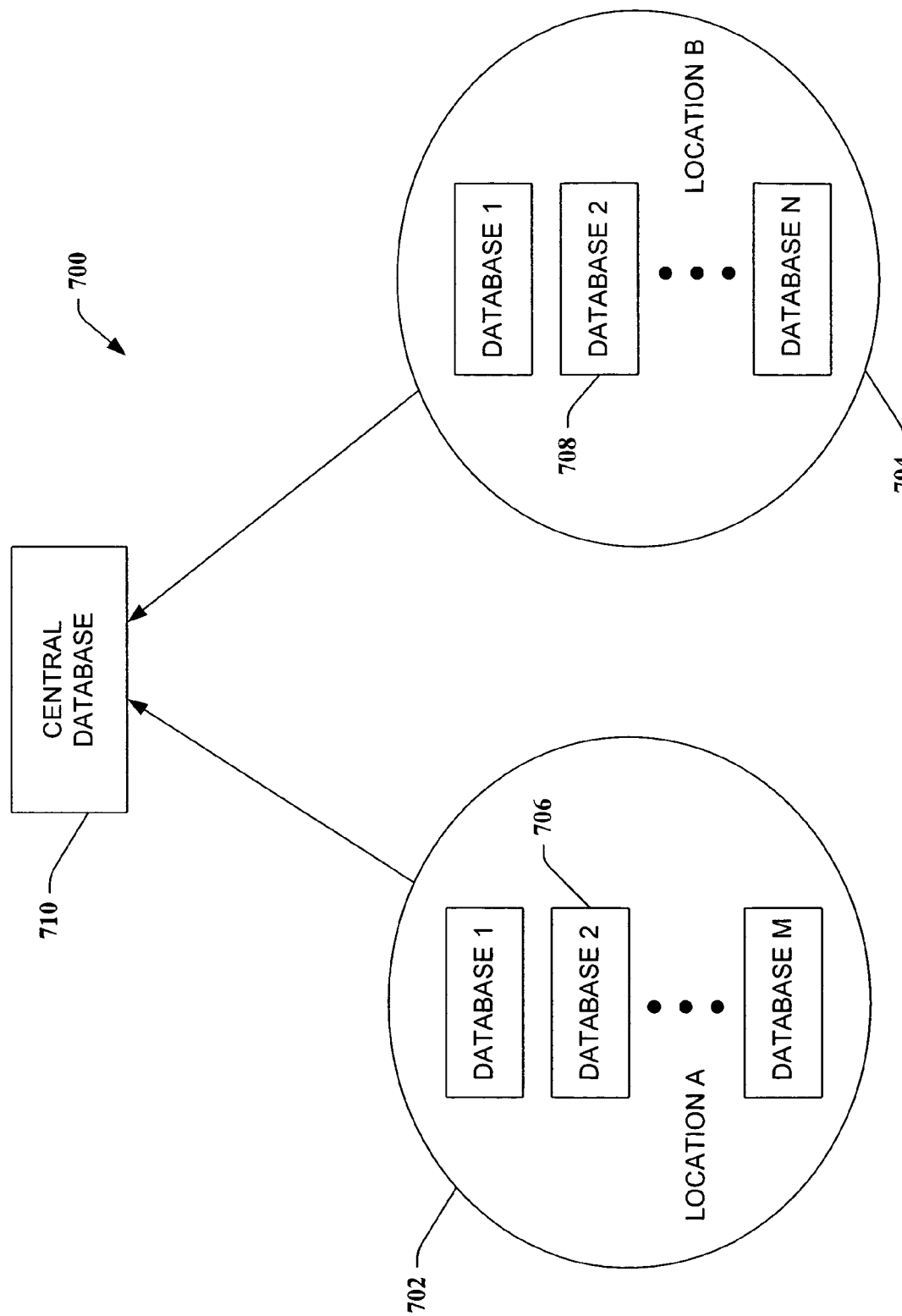
FIG. 7 is an exemplary environment wherein data rollup utilizing unique identifiers is beneficial in accordance with an aspect of the present invention.

Now referring to FIG. 7, an exemplary environment 700 wherein utilization of unique identifiers of the present invention is particularly beneficial is illustrated. The environment 700 includes at least two locations, location A 702 and location B 704. For instance, in a car-manufacturing environment, the locations 702 and 704 can represent disparate plants that are geographically separated by a significant distance. In another example, the locations 702 and 704 can represent disparate lines within a single factory/plant. The location A 702 includes M databases 706, where M is an integer. These databases 706 can include objects relating to disparate applications. For one particular example, the databases can represent disparate paint lines, bodylines, etc. within a car-manufacturing environment. Similarly, location B 704 includes N databases 708, where N is an integer. These databases 708 can include objects that are employed in a substantially similar manner as objects within the databases 706. For instance, the databases 708 can include objects relating to paint lines, body lines, finishing lines, etc. within a car-manufacturing plant.

It may be desirable to combine the databases 706 with the databases 708 within a central database 710 to effectuate an efficient comparison between performance of location A 702 and performance of location B 704. Utilizing conventional systems and/or methodologies would result in possible overwriting of data, and would require a substantial amount of time to manually separate disparate indexing schemes within the central database 710. For instance, contents of one database at location A 702 may require a different indexing scheme than a disparate database at location A 702 due to different identification schemas (e.g., differences between objects identified by time-stamps and objects identified by sequence numbers). GUIDs could be employed to mitigate occurrences of overwrite, but indexing then becomes problematic due to lack of identifying indicia within the GUID. The unique identifiers of the present invention enable combination of various databases containing objects relating to manufacturing (e.g., data rollup) while providing a singular indexing scheme and mitigating occurrences of data overwrite. Thus, the databases 706 and 708 can be rolled into the central database 710, and objects therein can be interrogated and/or compared.

Turning now to FIG. 8, an exemplary database 800 employing one or more aspects of the present invention is illustrated. The database 800 includes a plurality of rows 802, wherein each row is required to be unique to avoid overlap and data overwrite. The rows include an object and a unique identifier associated with each object, thus ensuring that the rows remain unique. Particularly, object 1 is associated with unique identifier 1, object 2 is associated with unique identifier 2, and so forth. The unique identifiers include identifying indicia, such as time-stamp data or sequential data. The unique identifiers also include random numbers to mitigate occurrences of overlap between unique identifiers. One substantial benefit of employing the unique identifiers of the present invention is that a plurality of indexing schemes is not required. Particularly, if only time-stamps or only sequential numbers are employed to identify objects, such objects need to be indexed separately to effectuate efficient searching and/or interrogation. The present invention enables such objects to be indexed in a single scheme, thus making searching/interrogating a more efficient process for a user. Further, as described above with respect to FIG. 7, the database 800 can be combined with one or more disparate databases without fear of differing indexing schemes and/or data overwrite.

Figure 9:
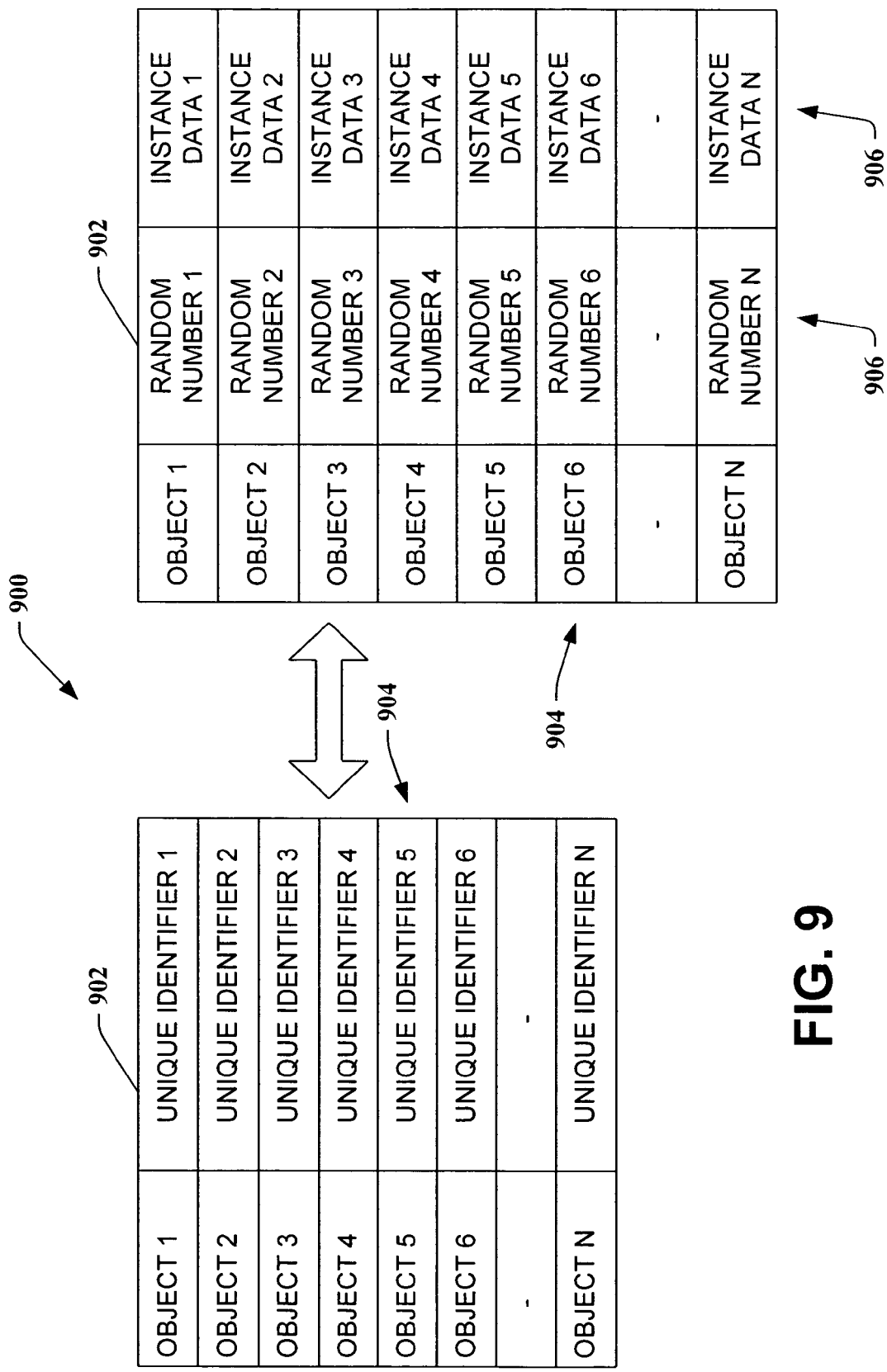
FIG. 9 illustrates a transformation in database structure that is possible when utilizing the unique identifiers of the present invention.

Turning now to FIG. 9, a database manipulation 900 that can be employed in accordance with an aspect of the present invention is illustrated. A database 902 includes a plurality of rows 904, wherein each row comprises an object and a unique identifier created in accordance with the present invention. One or more algorithms can be employed to expand the database, thereby enabling portions of the unique identifier to reside in separate fields 906. For example, the unique identifier can include random data and object instance data (e.g., time-stamp and/or time-related data and sequence number and/or series-related data). While not illustrated, the unique identifier can include class type information, version number information, name of object, location of generation, or any other suitable indicia that can be employed to identify an object corresponding to the unique identifier. Further, these indicia can each be placed within separate fields within the database. Thereafter, each field (e.g., column) can be individually searched when employing the present invention. One or more algorithms can also be provided to manipulate the database 902 to condense the fields containing various identifying indicia into a singular unique identifier. Such manipulation is useful in situations that a central directory indexes objects within a plurality of databases based upon unique identifiers, but individual searches of the database based upon particular portions of identifying indicia are also desirable.

Figure 10:
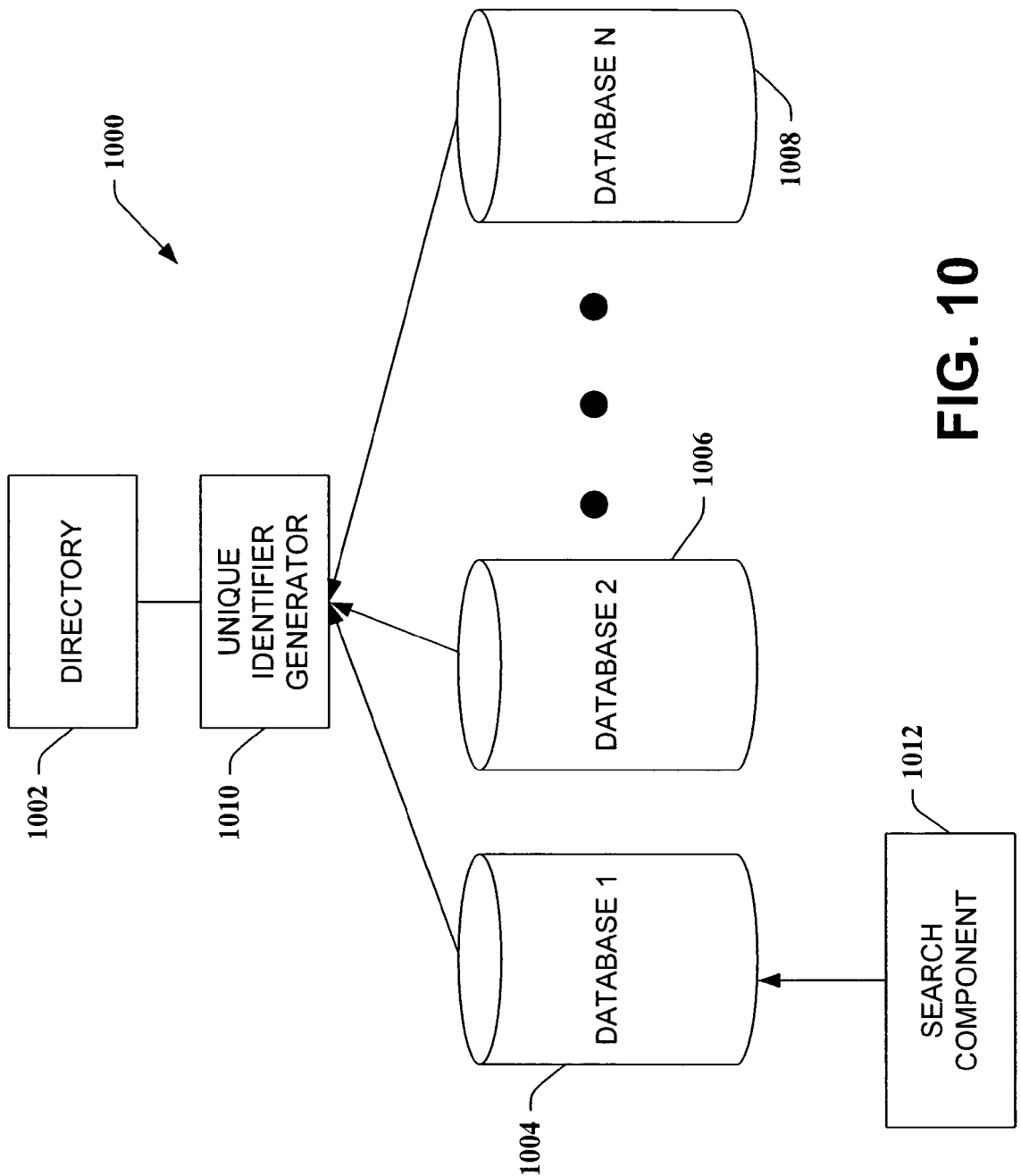
FIG. 10 is an exemplary directory environment wherein objects in a distributed system are called based at least in part upon the unique identifiers of the present invention.

Referring now to FIG. 10, a system 1000 that facilitates searching and indexing of a plurality of objects within one or more databases is illustrated. The system 1000 includes a directory 1002 that indexes objects by a unique identifier associated with such objects. As factories and/or organizations adopt unified plant models, directories such as the central directory 1002 will become more prevalent. The central directory 1002 is employed to index/retrieve objects that are located within a plurality of databases 1004-1008. In accordance with one aspect of the present invention, the central directory 1002 can be at least partly automated, wherein it is employed to automatically located and communicate objects to a variety of machines. Utilizing unique identifiers renders such an application efficient, as the central directory 1002 can simply call for an object with a particular identifier associated therewith. Moreover, utilizing the unique identifiers of the present invention provides a mechanism that is compatible with conventional identification techniques. For instance, the central directory 1002 can include a listing of a plurality of pre-existing objects that are identified solely by an associated GUID, as well as a listing of objects that are identified by the unique identifiers of the present invention. Due to compatibility of such unique identifiers with GUIDs, the central directory 1002 does not need to be completely reconfigured to accommodate the improved identifiers.

The system 1000 further includes a unique identifier generator 1010 that creates unique identifiers based upon information contained within the plurality of databases 1004-1008. The databases 1004-1008 include a plurality of rows, wherein each row comprises an object and object instance data associated therewith. The rows can further comprise various other suitable identifying indicia, such as object class, object version, location of generation, etc. For instance, these disparate identifying indicia can reside within a plurality of different fields. This enables a local search component 1012 to search the database 1004 (or any other database attached to the local search component 1012) by field. For example, the search component 1012 can search the database 1004 based upon date of creation of an object. The search component 1012 will then return all objects that were created on the specified day, together with other identifying indicia. A user can thereafter locate a desired object based upon date of creation and other returned indicia, while rows remain unique due to an associated random number within one of the fields together with other identifying indicia.

The present invention contemplates efficient transformation of databases with respect to data resident within fields and unique identifiers. For example, the central directory 1002 can receive a request for a particular object based upon a unique identifier. The central directory 1002 will relay the request to the unique identifier generator 1010, which will generate unique identifications based upon identifying indicia of objects within the databases 1004-1010. For example, the unique identifier generator 1010 can be associated with memory and temporarily store the generated unique identifiers within the memory. In a disparate embodiment, the databases 1004-1008 can be manipulated as shown with respect to FIG. 9 (e.g., the fields of identifying indicia can be condensed into a unique identifier that includes such identifying indicia). Once a generated unique identifier matches the desired unique identifier within the central directory 1002, the central directory 1002 can be informed of location of the object within the database(s) 1004-1010. The desired object can thereafter be accessed.

Figure 11:
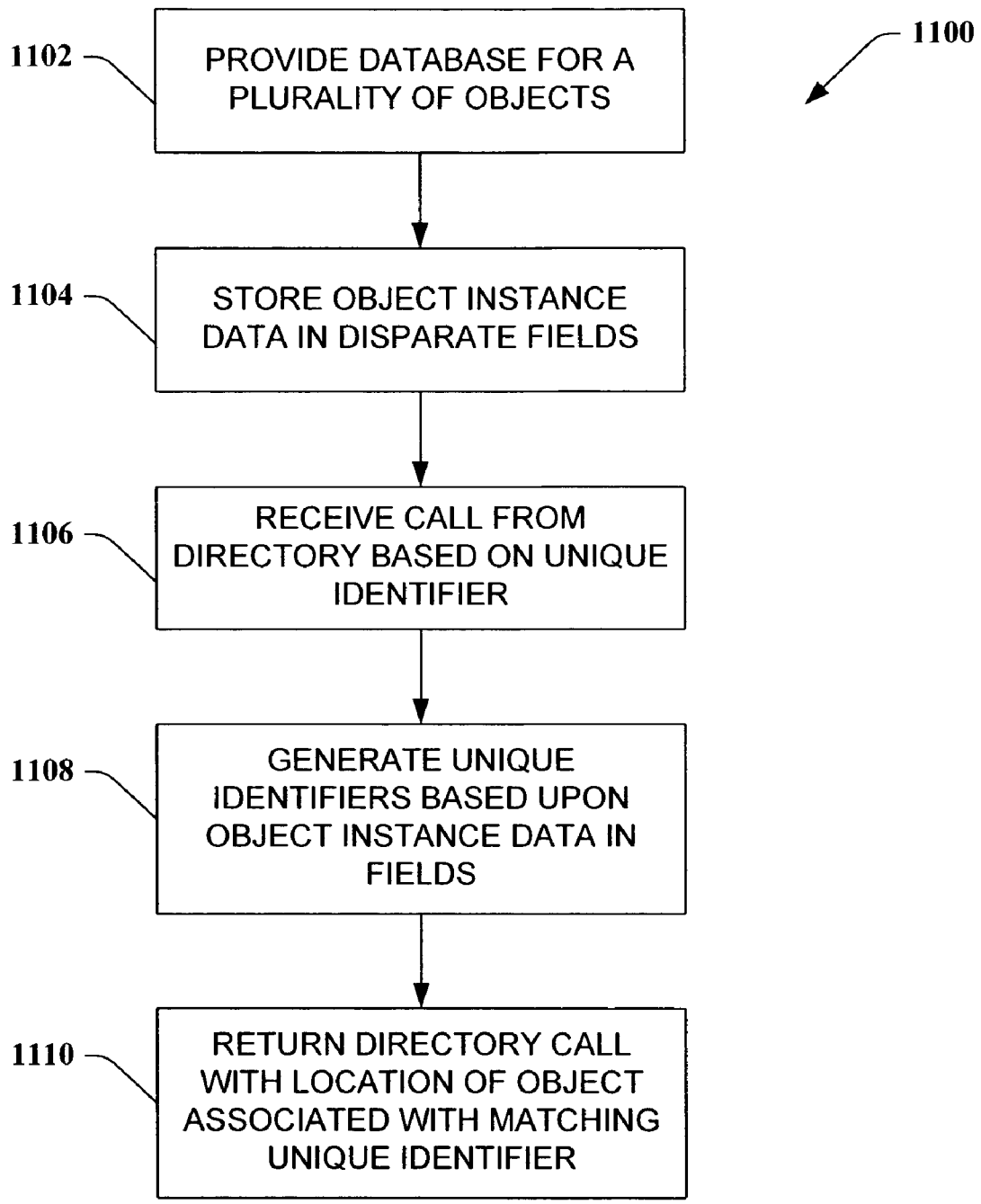
FIG. 11 is a representative flow diagram of a methodology for obtaining an object based upon a directory call via utilizing the unique identifiers of the present invention.

Now turning to FIG. 11, a methodology 1100 for providing unique identifiers according to a directory call is illustrated. At 1102, a database that stores and/or indexes a plurality of objects is provided. Various types of memory can be employed in effectuating the database. For example, by way of illustration, and not limitation, nonvolatile memory that is employable in connection with the databases can include read only memory (ROM), programmable ROM (PROM), electrically programmable ROM (EPROM), electrically erasable ROM (EEPROM), or flash memory. Volatile memory that can be employed in connection with the present invention can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory discussed above is intended to comprise, without being limited to, these and any other suitable types of memory.

At 1104, object instance data is stored within the database in a plurality of disparate fields. Databases include one or more rows and one or more columns. Thus, each row includes one or more fields where data can be stored. The rows in a database must be unique—otherwise data overlap and data overwrite occur. The object instance data is defined as time-stamps, time-related data, sequence numbers, and/or series-related data. Various other identifying indicia, such as object name, object class, version number, object type, etc. can also be stored within one or more fields within the database.

At 1106, a call from a directory based upon a unique identifier is received. This unique identifier is utilized by the directory to locate an object associated with the unique identifier. For example, the directory will search the fields for a unique identifier that matches the unique identifier that is requested. Upon location of the matching unique identifier, the directory will forward that location onto a requesting machine. At 1108, unique identifiers are generated for objects within the database based at least in part upon the object instance data within the fields. If a random number is not associated with the object, then a random number generator will be provided to ensure uniqueness across an enterprise system between unique identifiers. Thus, a unique identifier can be generated based upon the random number and the object instance data, even if such unique identifier did not previously exist. This generated unique identifier can be stored in the database and associated with the object, or temporarily stored in memory for purposes of locating the object associated with the requested unique identifier. For instance, it may be desirable to keep separateness of instance data and various other identifying indicia in the database, rather than condensing that data into a unique identifier.

At 1110, the directory call is returned with location of the object associated with the matching unique identifier. The methodology 1100 is beneficial over conventional methods of directory-assisted location of objects, as the methodology 1100 utilizes data that is often employed in a manufacturing environment to uniquely identify objects. The methodology 1100 is further compatible with previous indexing schema, such as employing GUIDs or other identifiers generated in a UUID format.

Figure 12:
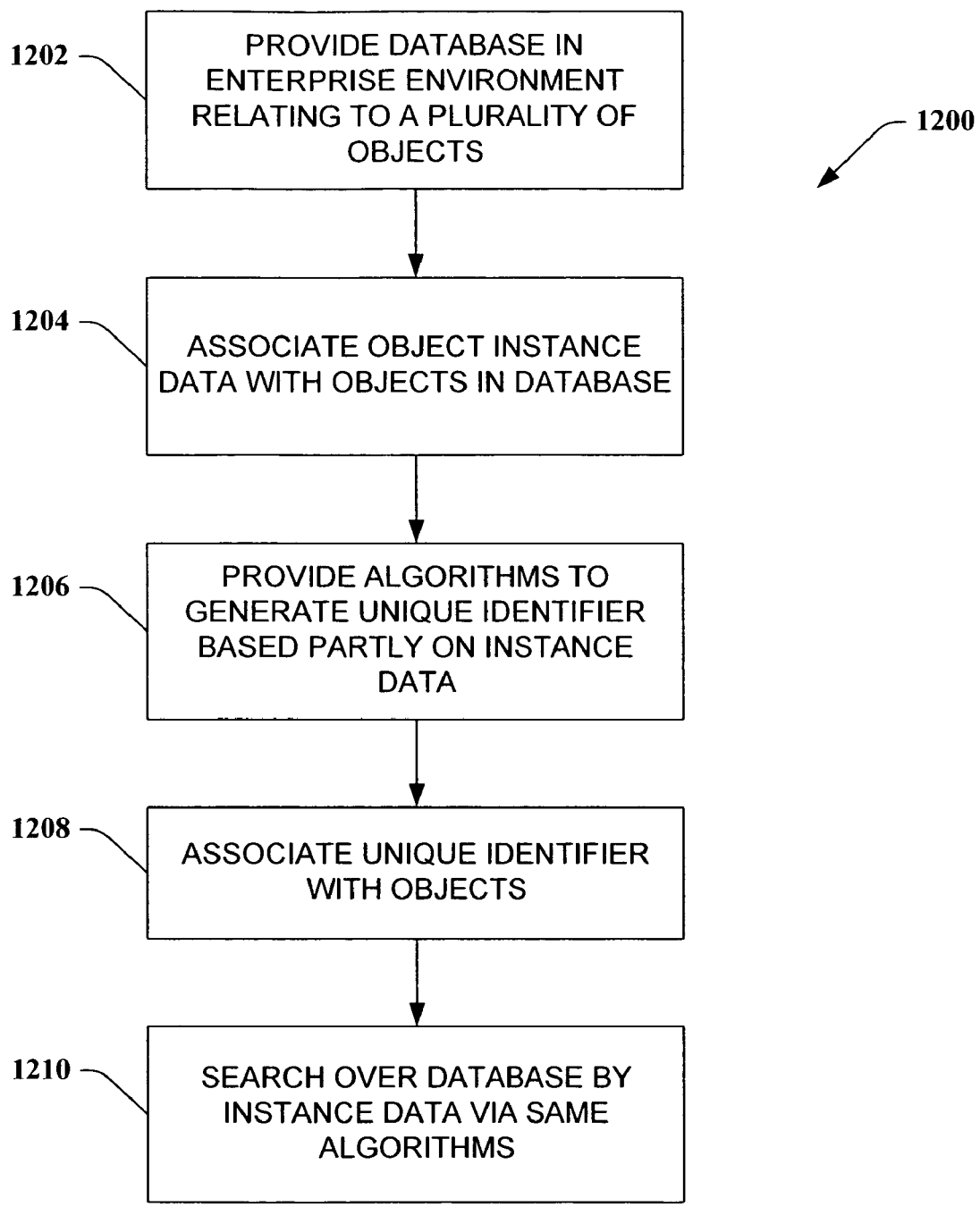
FIG. 12 is a representative flow diagram of a methodology for generating a unique identifier based at least in part upon object instance data resident within a database in accordance with an aspect of the present invention.

Turning now to FIG. 12, a methodology 1200 that facilitates indexing and/or searching a database via unique identifiers is illustrated. At 1202, a database in an enterprise environment is provided, wherein the database is employed to retain objects relating to manufacturing. For example, work orders relating to a particular manufacturing process can be stored within the database. At 1204, object instance data (time-stamps and/or sequence numbers) relating to each object are associated with such objects within the database. Further, various other identifying indicia can be associated with the objects within the database. At 1206, one or more algorithms are provided to generate unique identifiers for the objects based at least in part upon the object instance data. Particularly, the unique identifiers at least include a random number as well as the object instance data. The unique identifiers often will include other identifying indicia, such as MAC address, object type, version number, and any other suitable indicia that can be useful in searching/indexing objects. In accordance with one aspect of the present invention, the unique identifiers are created in UUID format, thereby enabling compatibility between the unique identifiers of the present invention and conventional identifiers (e.g., GUIDs), particularly when a central directory is employed to locate objects within an enterprise environment. Further, the same one or more algorithms can be employed to generate unique identifiers regardless of type of object instance data that is associated with each object. For instance, the one or more algorithms can be employed to generate a unique identifier based at least in part upon a time-stamp as well as a unique identifier based at least in part upon a sequence number. This enables creation and implementation of a common indexing scheme, regardless of type of object instance data and other identifying indicia that is employed to generate the unique identifier.

At 1208, the generated unique identifiers are associated with corresponding objects in the database. For example, a unique identifier can be stored in a row with a corresponding object. At 1210, a search is performed over the objects in the database via the unique identifiers by employing a single set of algorithms. As the unique identifiers are created by a common set of algorithms regardless of object instance data associated with a corresponding object, a common set of algorithms can be employed to index/search over the objects via the unique identifiers. Thus, a search for objects generated on a particular day can be utilized without requiring separate indexing of objects associated with sequence numbers.

Figure 13:
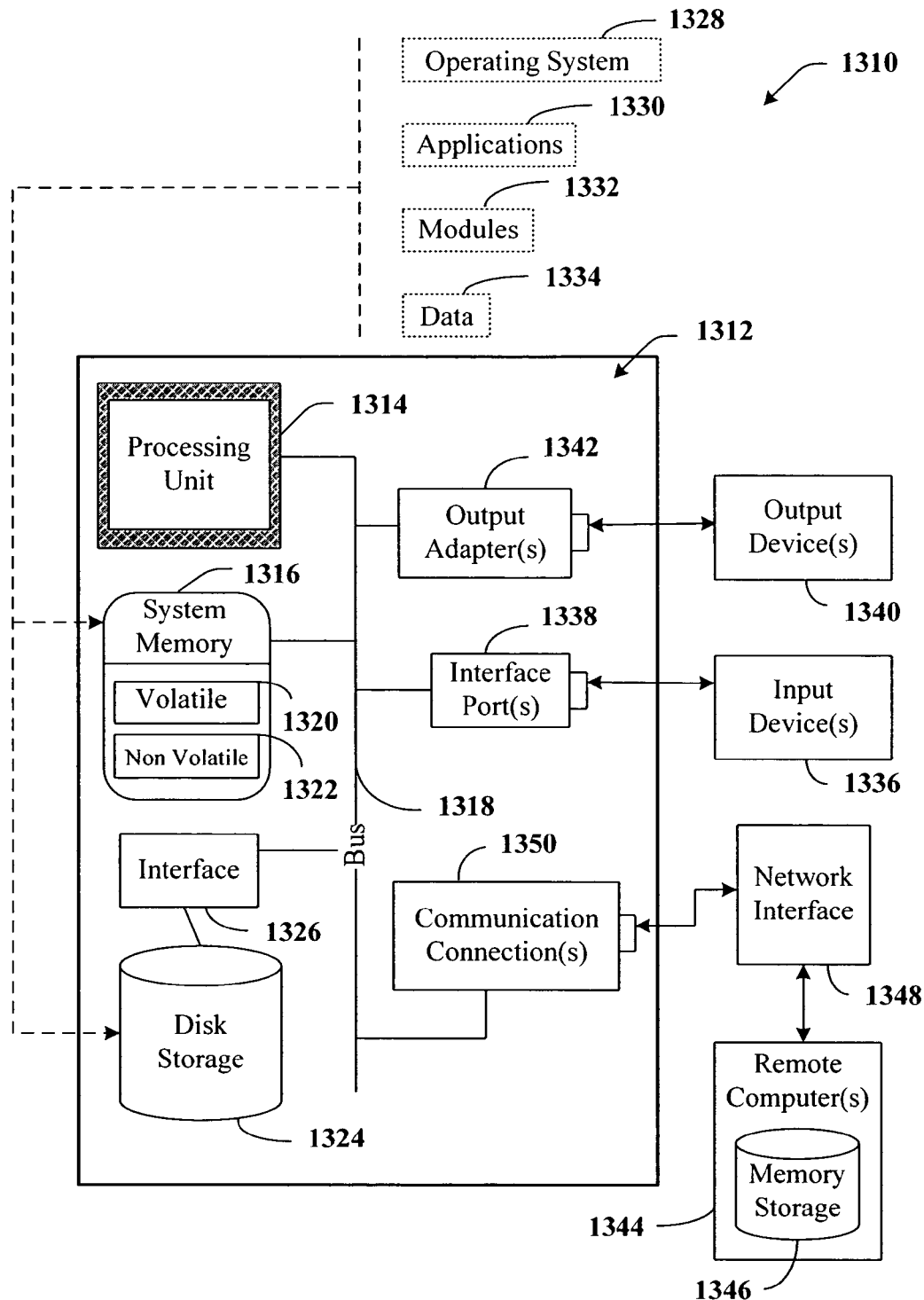
FIG. 13 is an exemplary operating environment in which the present invention can function.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
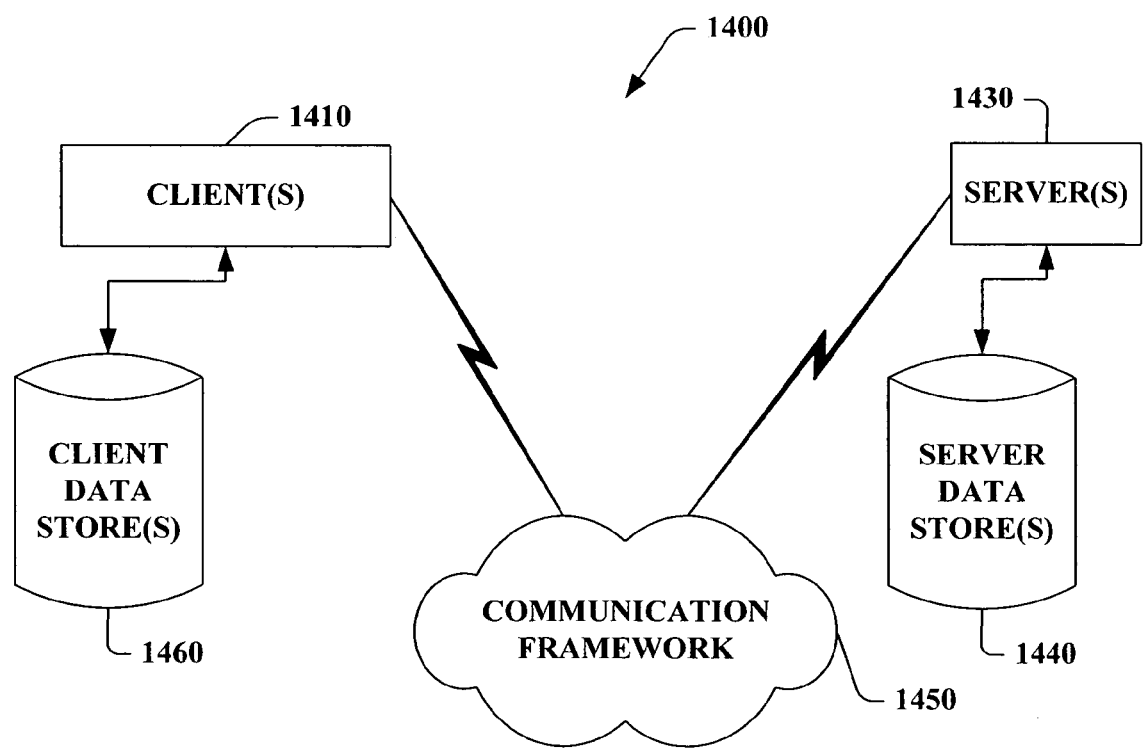
FIG. 14 is an exemplary computing environment that can be employed in connection with the present invention.

FIG. 14 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that generates unique identifiers for work orders utilized in a factory, comprising:
 a processor;
 a memory communicatively coupled to the processor;
 a randomizer component that generates pseudo-random data, wherein the pseudo-random data includes information indexed into at least one system table that indicates information indicating a location in an industrial hierarchy of the factory where a work order is generated; and
 a unique identifier creator that receives the pseudo-random data and receives object instance data associated with the work order and combines the object instance data and the pseudo-random data to generate a unique identifier for the work order,
 wherein the object instance data comprises time stamp data for the work order utilized in the manufacturing environment and location data for the work order utilized in the manufacturing environment, the location data includes at least one of a path for a machine that created the work order or a node identifier.

2. The system of claim 1, further comprising a component that associates the unique identifier with the work order utilized in the manufacturing environment.

3. The system of claim 1, wherein the unique identifier creator generates the unique identifier in accordance with Universally Unique Identifier (UUID) standards.

4. The system of claim 1, wherein the unique identifier has a size of 128 bits.

5. The system of claim 1, wherein the unique identifier creator generates the unique identifier at a time of creation of the work order utilized in the manufacturing environment.

6. The system of claim 1, wherein the unique identifier creator generates the unique identifier at a time of creation of the object instance data.

7. The system of claim 1, wherein the unique identifier is employed in connection with indexing the work order utilized in the manufacturing environment.

8. The system of claim 1, further comprising an extraction component that stores the pseudo-random data and the object instance data within separate fields of a database.

9. The system of claim 8, the extraction component stores the pseudo-random data, the timestamp data and the location data within separate fields of the database.

10. The system of claim 1, wherein the timestamp data comprises time formatted according to Universal Coordinated Time.

11. The system of claim 1, wherein the timestamp data comprises time formatted according to FILETIME.

12. The system of claim 1, wherein the unique identifier creator comprises a conversion component that converts time from a localized time standard to a global time standard.

13. The system of claim 1, wherein the timestamp data comprises time formatted according to Greenwich Mean Time.

14. The system of claim 1, the object instance data further comprises a type of the work order utilized in the manufacturing environment.

15. The system of claim 1, the object instance data further comprises a structure of the work order utilized in the manufacturing environment.

16. The system of claim 1, the location data for the work order utilized in the manufacturing environment comprises a media access controller (MAC) address.

17. The system of claim 1, the object instance data further comprises an object name.

18. The system of claim 1, the object instance data further comprises an object version number.

19. The system of claim 1, the unique identifier creator receives archived object instance data associated with an archived object utilized in the manufacturing environment and utilizes the archived object instance data associated with the archived object utilized in the manufacturing environment to generate the unique identifier.

20. A method for uniquely identifying objects generated in a distributed enterprise system, comprising:
 employing a processor executing computer executable instructions stored on a computer readable storage medium to implement the following acts:
 receiving time-stamp data, related to a time of generation of an object, formatted according to a standard consistent across the distributed enterprise system and location data that identifies a location within the distributed enterprise system where the object is generated;
 receiving pseudo-random data from a randomizer component, wherein the pseudo-random data includes information indexed into at least one system table that indicates information indicating a location in an industrial hierarchy where a unique identifier is generated;
 combining the time-stamp data, the location data and the pseudo-random data to generate the unique identifier that uniquely identifies the object; and
 associating the unique identifier with the object, wherein the object is a work order generated in a factory.

21. The method of claim 20, wherein associating the unique identifier with the object further comprises embedding the unique identifier within the object.

22. The method of claim 20, wherein associating the unique identifier with the object further comprises linking the unique identifier with the object.

23. The method of claim 20, further comprising receiving a directory call for the object and combining the time-stamp data, the location data and the random number in response to the directory call.

24. The method of claim 20, wherein the forming the unique identifier further comprises generating the unique identifier in a format in accordance with Universally Unique Identifier (UUID) standards.

25. The method of claim 20, wherein the forming the unique identifier further comprises generating the unique identifier of a size of 128 bits.

26. The method of claim 20, wherein the location data comprises an identity of a node in the distributed enterprise system.

27. The method of claim 20, further comprising indexing the object according to the unique identifier.

28. The method of claim 20, further comprising interrogating the unique identifier and extracting information from the unique identifier.

29. The method of claim 20, further comprising:
    partitioning the unique identifier into the pseudo-random data, time-stamp data and the location data; and
    storing the pseudo-random data, the time-stamp data and the location data within separate fields of a database.

30. The method of claim 20, wherein the location data comprises an identity of a machine.

31. The method of claim 20, further comprising receiving object identifying data, comprising at least one of an object name or an object version number and combining the time-stamp data, the location data, the object identifying data and the random number to generate the unique identifier that uniquely identifies the object.

32. The method of claim 20, further comprising hashing at least one of the time-stamp data or the location data.

* * * * *